United States Patent [19]
Clark et al.

[11] Patent Number: 5,588,676
[45] Date of Patent: *Dec. 31, 1996

[54] STAMPED METAL TOROIDAL HYBRID GAS GENERATOR

[75] Inventors: Randall J. Clark, Pleasant View; Bradley W. Smith, Ogden; Kirk H. Rasmussen, West Point, all of Utah; Leland B. Kort, Lakewood, Colo.

[73] Assignee: Morton International, Inc., Chicago, Ill.

[*] Notice: The term of this patent shall not extend beyond the expiration date of Pat. No. 5,516,147.

[21] Appl. No.: 615,898

[22] Filed: Mar. 14, 1996

Related U.S. Application Data

[62] Division of Ser. No. 321,786, Oct. 12, 1994, Pat. No. 5,516,147.

[51] Int. Cl.⁶ .................................................. B60R 21/28
[52] U.S. Cl. ........................ 280/741; 280/737; 280/736; 222/5
[58] Field of Search ................................ 280/741, 736, 280/737, 740, 742; 222/3, 5; 102/530, 531; 422/164, 166

[56] References Cited

U.S. PATENT DOCUMENTS

| | | | |
|---|---|---|---|
| 3,960,390 | 6/1976 | Goetz | 280/731 |
| 5,062,367 | 11/1991 | Hayashi et al. | 102/530 |
| 5,114,179 | 5/1992 | Emery et al. | 280/741 |
| 5,139,280 | 8/1992 | Cord et al. | 280/741 |
| 5,149,129 | 9/1992 | Unterforsthuber et al. | 280/736 X |
| 5,184,846 | 2/1993 | Goetz | 280/736 |
| 5,199,740 | 4/1993 | Frantom et al. | 280/736 |
| 5,217,697 | 6/1993 | Kanazawa et al. | 422/165 |
| 5,226,668 | 7/1993 | Delonge-Immil et al. | 280/737 |
| 5,259,644 | 11/1993 | Albrecht et al. | 280/741 |
| 5,423,570 | 6/1995 | Kort et al. | 280/736 |
| 5,437,472 | 8/1995 | Kuretake et al. | 280/737 |

FOREIGN PATENT DOCUMENTS

| | | | |
|---|---|---|---|
| 0639483 | 2/1995 | European Pat. Off. | B60R 21/26 |
| 2243843 | 4/1975 | France | B60R 21/10 |
| 2443267 | 3/1975 | Germany | B60R 21/40 |

*Primary Examiner*—Christopher P. Ellis
*Attorney, Agent, or Firm*—George W. Rauchfuss, Jr.; Gerald K. White

[57] ABSTRACT

A hybrid inflator comprises a housing formed of welded-together metal stampings defining a toroidal gas chamber surrounding a center tie and storing pressurized gas therein. The center tie has a generally cylindrical sidewall and an outlet wall at an upper end thereof defines a rupturably sealed outlet orifice. An inverted stamped metal cup is matingly received in the center tie. The lip of the cup is welded to the lower end of the center tie, and the cup sidewall is circumferentially grooved for separating a sliding piston portion under pressure. A squib support wall and squib closes the lower end of the center tie and inverted cup to define a combustion chamber containing a pyrotechnic gas generant which, upon ignition, causes the inverted cup to separate at the groove and drive the sliding piston upwardly to an open position uncovering inlet openings from the combustion chamber to the gas storage chamber. Hot gasses from the combustion chamber flow into the gas storage chamber and the outlet orifice rupturably opens permitting stored gas and combustion products to exit the inflator. The sliding piston and center tie are tapered to control movement of the piston by friction and deformation, together with lanced limit stop tabs. The cup has a convex bottom, deformation portions and may carry a lance to open the orifice. A baffle provides a surface on which incomplete products of combustion are collected and captures debris. A deformable outlet diffuser provides compact packaging.

10 Claims, 2 Drawing Sheets

STAMPED METAL TOROIDAL HYBRID GAS GENERATOR

This application is a divisional application of application Ser. No. 08/321,786 filed on Oct. 12, 1994, now Pat. No. 5,516,147.

FIELD OF INVENTION

The invention herein relates to a compact hybrid inflator for vehicle occupant restraint systems, in which the inflator housing is made of stamped metal parts including a breakaway sliding piston.

BACKGROUND OF INVENTION

Hybrid inflators for vehicle occupant restraint systems utilize a combination of stored inert gas and the products of combustion of pyrotechnic material to deploy an airbag. The inert gas is stored in a chamber at a relatively high pressure on the order of 2,000 to 4,000 pounds per square inch. The pressure chamber is adjacent to a combustion chamber that contains an initiator and a pyrotechnic material for producing hot combustion gasses which are delivered to the stored inert gas. The mixture of the hot combustion gasses and stored inert gasses are delivered through an outlet to inflate the airbag of the occupant restraint system.

Hybrid inflators are particularly useful in that no Azide is required in the inflation system, and that complex filters are not required to cool and clean the gasses.

The housings of hybrid inflators are generally fabricated of machined and/or forged metal parts and numerous configurations are provided in the art for delivering the hot combustion gasses of the pyrotechnic material to the gas storage chamber, and for opening an outlet passage of the housing for inflating the airbag. Examples of such structures are shown in Vancil U.S. Pat. No. 3,788,667, Grosch et al. U.S. Pat. No. 3,797,853, Grosch et al. U.S. Pat. No. 3,836,170, Merrell U.S. Pat. No. 3,856,180, Merrell U.S. Pat. No. 3,856,181, Johnson U.S. Pat. No. 3,868,124, Merrell U.S. Pat. No. 3,869,143, Zeigler U.S. Pat. No. 3,865,273, Smith et al. U.S. Pat. No. 3,944,249, Meacham U.S. Pat. No. 3,948,540, Goetz U.S. Pat. No. 3,960,390, Marlow U.S. Pat. No. 3,966,225, Roth U.S. Pat. No. 3,966,226, Hay U.S. Pat. No. 3,968,980, Woods et al. U.S. Pat. No. 5,076,607 and Frantom U.S. Pat. No. 5,199,740.

Because the inflators in the foregoing patents, and particularly the ones which are toroidal in configuration, comprise machined and/or forged parts, they are accordingly complex in the number of parts and assembly, and high in cost. Given the widespread use of inflators, there is a corresponding need to reduce the complexity and cost thereof, as well as the size and weight without sacrificing efficient operation and reliability.

SUMMARY OF THE INVENTION

Accordingly, it is a principal object of the invention herein to provide a hybrid inflator for vehicle occupant restraint systems which is efficient and reliable in operation.

It is an additional object of the invention herein to provide a hybrid inflator which is compact and low in weight.

It is a further object of the invention herein to provide a hybrid inflator of low complexity with respect to the configuration of its parts and attendant low cost of manufacture.

It is an additional object of the invention herein to provide a hybrid inflator having a housing made of stamped metal parts.

In accomplishing these and other objects of the invention herein, there is provided a hybrid inflator having a generally toroidal housing formed of welded-together metal stamped parts, the housing defining a stored gas chamber surrounding a center tie, and the gas chamber storing a pressurized inert gas. The center tie has a generally cylindrical sidewall and an outlet wall at the upper end thereof, the outlet wall defining a rupturably sealed outlet orifice. An igniter assembly including a pyrotechnic gas generant and squib initiator are mounted in the center tie with appropriate passages for delivering hot gasses to the stored gas and a mix of hot and stored gas to the airbag. According to one aspect of the invention, the igniter assembly includes an inverted stamped metal cup having a generally cylindrical sidewall matingly received in the generally cylindrical sidewall of the center tie. The metal cup has an end wall extending across the center tie to define, together with an upper portion of the center tie sidewall and the outlet wall, an outlet cavity adjacent the outlet orifice. The inverted cup also has a lip adjacent its open end secured to the lower end of the center tie, and the sidewall of the inverted cup adjacent the lip has a circumferential groove to provide for separation of the cup from the lip. A squib support wall closes the lower end of the center tie and inverted cup to define a combustion chamber cavity within the inverted cup. The pyrotechnic gas generant material is provided within the combustion chamber and the squib support wall mounts a squib for igniting it.

Upon ignition of the pyrotechnic gas generant material, the expanding combustion products including hot gasses cause the inverted cup to separate at the circumferential groove and drive the separated inverted cup upwardly in the center tie to an open position. The center tie defines at least one inlet opening from the combustion chamber to the gas chamber, and this inlet opening is positioned to be exposed for a flow of combustion products into the stored gas chamber when the inverted cup is driven to its open position. The combustion products including hot gas flow into the gas chamber to heat and thereby increase the pressure of the stored gas therein. The center tie also defines at least one outlet opening from the gas chamber to the outlet cavity, which opening remains unblocked by the inverted cup in its open position and thereby provide a flow path to the outlet orifice. The sealed outlet orifice rupturably opens after ignition of the pyrotechnic gas generant material, permitting stored gas and hot combustion gasses to exit the inflator through the outlet opening in the center tie wall, the outlet cavity and the outlet orifice.

According to one aspect of the invention, the outlet orifice is sealed by a diaphragm which ruptures upon increased pressure within the housing. According to another aspect of the invention, the rupturably sealed outlet orifice is opened by a lance extending from the inverted cup and driven through the orifice by the upward sliding motion of the inverted cup.

According to further aspects of the invention, the generally cylindrical center tie wall and the inverted cup have surfaces which taper inwardly in the direction of cup movement, wherein friction and deformation of the inverted cup occur as it slides upwardly limit the speed and extent of its upward travel. Additionally, the center tie wall in the outlet cavity above the inverted cup has inwardly lanced tabs which provide a mechanical limit stop for the inverted cup.

Another particular aspect of the invention is in providing a diffuser over the outlet orifice, and advantageously the diffuser is formed of a stamped metal part fitted snugly against the outlet orifice and deformable away from the outlet orifice by the inflation gasses exiting the inflator housing. The deformable diffuser provides a more compact inflator prior to operation, and also absorbs some of the energy from the initial surge of gas to provide a controlled initial inflation of the airbag.

According to another aspect of the invention herein, a baffle is included within the housing juxtaposed the outlet opening from the pyrotechnic generant chamber, the baffle receiving and condensing or plating thereon incomplete products of combustion and thus reducing the amount of particles which are undesirable in the stream of inflation gasses.

The various features of novelty which characterize the invention are pointed out with particularity in the claims annexed to and forming a part of this specification. For a better understanding of the invention, its operating advantages and specific objects attained by its use, reference is made to the accompanying drawings and descriptive matter in which preferred embodiments of the invention are illustrated.

DRAWINGS

The same reference numerals refer to the same elements throughout the various figures.

DESCRIPTION OF PREFERRED EMBODIMENTS

Figure 1:
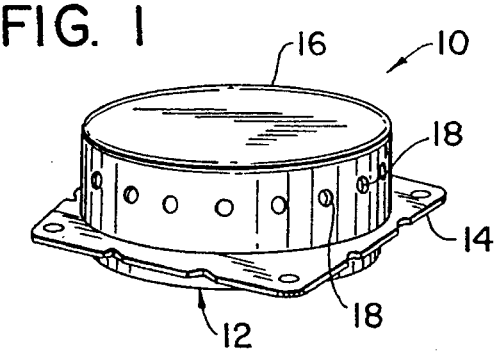
FIG. 1 is a perspective view of a hybrid inflator according to the invention herein.
Figure 2:
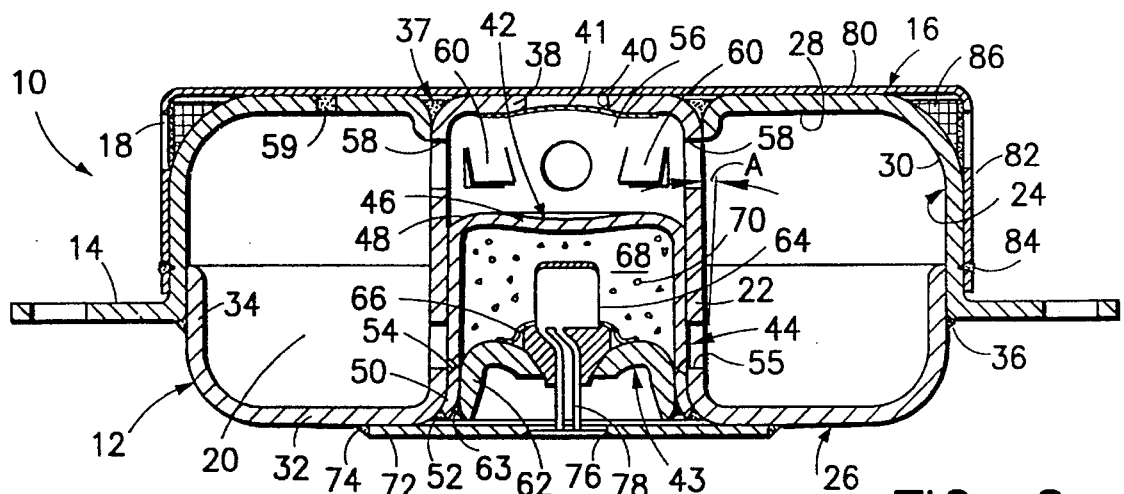
FIG. 2 is a cross-sectional view of the hybrid inflator of FIG. 1.
Figure 3:
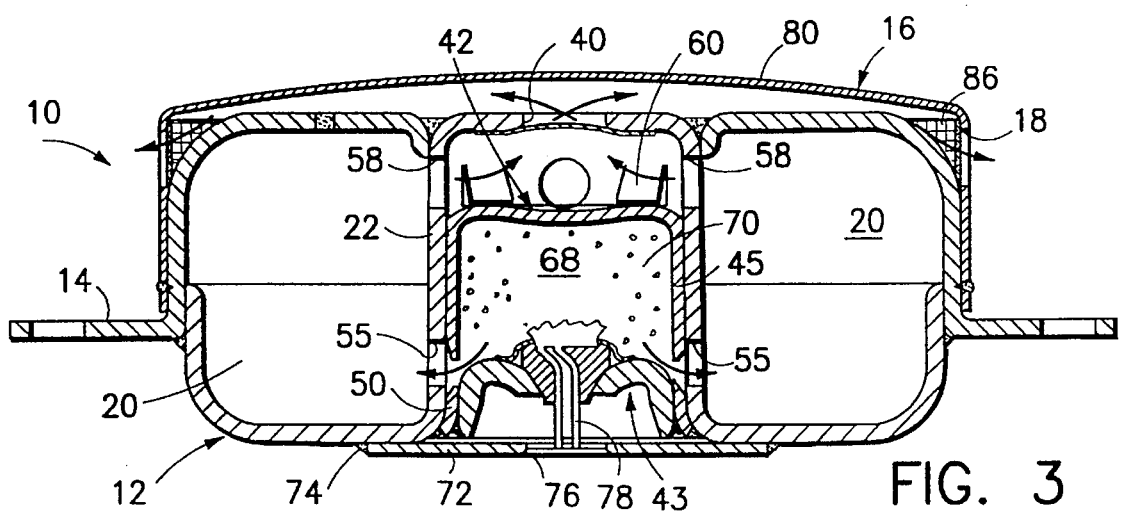
FIG. 3 is a cross-sectional view of the hybrid inflator of FIG. 1 shown operationally delivering inflation gas.

A hybrid inflator 10 according to the invention herein is shown in perspective view in FIG. 1 and in cross-sectional views in its assembled and operating conditions in FIGS. 2 and 3, respectively. The hybrid inflator 10 comprises a housing 12 formed of welded-together, stamped metal parts and including a mounting flange 14. A deformable diffuser 6 secured to the upper portion of the housing 12. The term "upper" as used herein refers to the diffuser side of the hybrid inflator and to the inflator as shown in the drawings, although the hybrid inflator may be mounted in a vehicle in a different orientation. When installed in a vehicle, an airbag (not shown in the drawings) is fitted over the diffuser and inflation gasses from diffuser exit openings 18 inflate the airbag.

The housing 12 defines a generally toroidal gas storage chamber 20 surrounding a center tie 22. The housing is formed of upper and lower stamped housing parts 24 and 26, respectively. The upper housing part 24 has an upper wall 28 forming the top of the gas storage chamber 20, the wall 28 integrally curving to a depending cylindrical sidewall 30. The mounting flange 14 is also formed integrally with the upper housing part 24, extending outwardly from the sidewall 30. The mounting flange may also be formed as an extension of the diffuser 16, or provided as a separate piece.

The upper wall 28 includes a central opening receiving the upper end of the center tie 22, as more fully discussed below.

The lower housing part 26 includes a bottom wall 32 which curves to join a cylindrical sidewall 34, the upper portion of which fits inside the cylindrical sidewall 30 of the upper housing part 24. These parts are welded together, as indicated at 36. The generally cylindrical center tie 22 is integral with the lower housing part 26, and extends upwardly from the bottom wall 32 to be received in the opening defined in the upper wall 28, where the center tie 22 and upper wall 28 are welded together as indicated at 37. The housing 12 further includes an outlet wall 38 extending across the top of center tie 22 and the opening in the upper wall 28, and defining an outlet orifice 40. Thus, the housing 12 is fabricated of only two stamped metal parts. A metal diaphragm 41 rupturably seals the outlet orifice An igniter assembly 43 comprises an inverted stamped metal cup 42 matingly received within the center tie 22, the inverted cup 42 including a sidewall 44 which fits closely within the sidewall of the center tie 22. Both the sidewall of the center tie and the sidewall of the cup are tapered at a five degree angle toward the outlet wall 38, the taper angle being shown at A in FIG. 2. The inverted cup has a convex bottom 46, which is joined with the sidewall 44 by a rounded transition portion 48.

The inverted cup has a lip 50 adjacent its open end, and the lip 50 is welded to the lower housing part 26 at the transition between the bottom wall and center tie 22, the weld being shown at 52. The lip 50 is separated from the sidewall 44 of the cup by a circumferential groove 54 which weakens the cup and predisposes its separation during operation of the inflator, as more fully discussed below. The center tie defines a plurality of inlet openings. 55 to the stored gas chamber, the inlet openings being positioned adjacent and just above the groove 54.

An outlet cavity 56 is defined within the center tie 22 above the inverted cup 42. The outlet cavity 56 communicates with the gas storage chamber 20 through openings 58 formed in the center tie sidewall. The sidewall of the center tie is also provided with a plurality of lanced tabs 60 which extend inwardly and provide stops for upward movement of the inverted cup, as also more fully discussed below. The welds securing the upper and lower housing parts together and securing the lip 50 of the inverted cup to the lower housing part, together with the rupturable diaphragm 41, provide a sealed chamber in which inert gas is stored under pressure. The gas is preferably argon or nitrogen under pressure of 2,000 to 4,000 pounds per square inch. The gas is loaded through a fill port sealed by a weld 59.

The igniter assembly 43 further comprises a stamped metal squib support wall 62 situated across the open end of the inverted cup, and welded or otherwise secured to the lip 50 of the inverted cup at 63. The squib support wall 62 defines a central opening which receives and supports an initiator 64, also known as a squib. The squib is held in position on the squib support wall 62 by a thin retainer member 66 which is spot welded to the squib support wall.

The inverted cup 42, the squib support wall 62 and the squib 64 supported thereby together define a combustion chamber 68, in which a pyrotechnic gas generant material 70 is contained. Boron potassium nitrate ($BKNO_3$) is a satisfactory pyrotechnic for use in the igniter assembly 43 of hybrid inflator 10. A connector retention plate 72 is welded, at 74, to the bottom wall 32 of the housing 12. The connector plate 72 defines a central opening 76 which receives and supports a plug connector, not shown, inserted over the leads 78 of the squib. The connector retention plate provides additional rigidity and support to the housing structure, and also supports the plug connector without need of a full mating recess to receive it.

The hybrid inflator 10 further comprises the diffuser 16 having a top panel 80 which, upon assembly and prior to operation of the inflator, lies closely adjacent the upper wall 28 and outlet wall 38 of the housing 12. The diffuser 16 further comprises a cylindrical sidewall 82 which is welded to the upper housing part 24 at 84. The sidewall 82 defines the diffuser outlet openings 18, and a screen 86 is preferably positioned within the diffuser covering the openings 18 to prevent debris from entering the airbag during the inflation process.

The operation of the hybrid inflator 10 is illustrated in FIG. 3. In response to a signal indicative of a vehicle crash, a control signal is communicated to the squib leads 78, thereby activating the squib 64 to ignite the pyrotechnic gas generant material 70. As pressure in the combustion chamber 68 rises, and exceeds the pressure of the stored gas exerted on the convex bottom wall 46 of the inverted cup, the inverted cup severs at the groove 54. The severed portion of the cup then becomes a sliding piston 45 which is driven upwardly within the center tie 22. The upward movement of the sliding piston portion 45 of the inverted cup is controlled by the taper of the cup and the center tie wall as well as by the friction between these parts. Both of these factors operate to slow or stop the sliding piston portion 45 of the inverted cup after it has moved far enough to expose the inlet openings 55, providing an entry passage for the hot burning gasses to the gas storage chamber. A complete stop of the sliding piston 45 is insured by the inwardly protruding lanced tabs 60, in the position shown in FIG. 3. The convex bottom 46 of the inverted cup 42 reduces the possibility of the bottom blowing out before the cup separates at the groove 54, and the transition portions 48 of the cup deform as the cup is driven upwardly in the tapered center tie.

The hot burning gasses enter the gas storage chamber 20 through the inlet openings 55, and heat the stored gas therein. This results in a pressure rise in the storage chamber 20 and when the rupture strength of the diaphragm 41 is exceeded, the diaphragm ruptures and allows the heated gas to vent through the outlet orifice 40. The momentum and pressure of the escaping gas deforms the diffuser, lifting the top panel 80 away from the outlet orifice 40, and creates a path for the gas to be delivered through the diffuser openings 18. The screen 86 prevents debris from the inflator, including portions of the ruptured diaphragm 41, from being carried into an airbag attached to the inflator. The orifice 40 throttles the flow of gas from the storage chamber and provides the proper fill rate into the airbag. The deforming of the diffuser 16 slows down the pressure onset to the airbag by absorbing some of the energy of the escaping gas, and "softens" the initial inflation of the airbag. Fitting the diffuser in close proximity to the housing also improves the packaging requirements in using the inflator for a driver's side airbag system.

Figure 4:
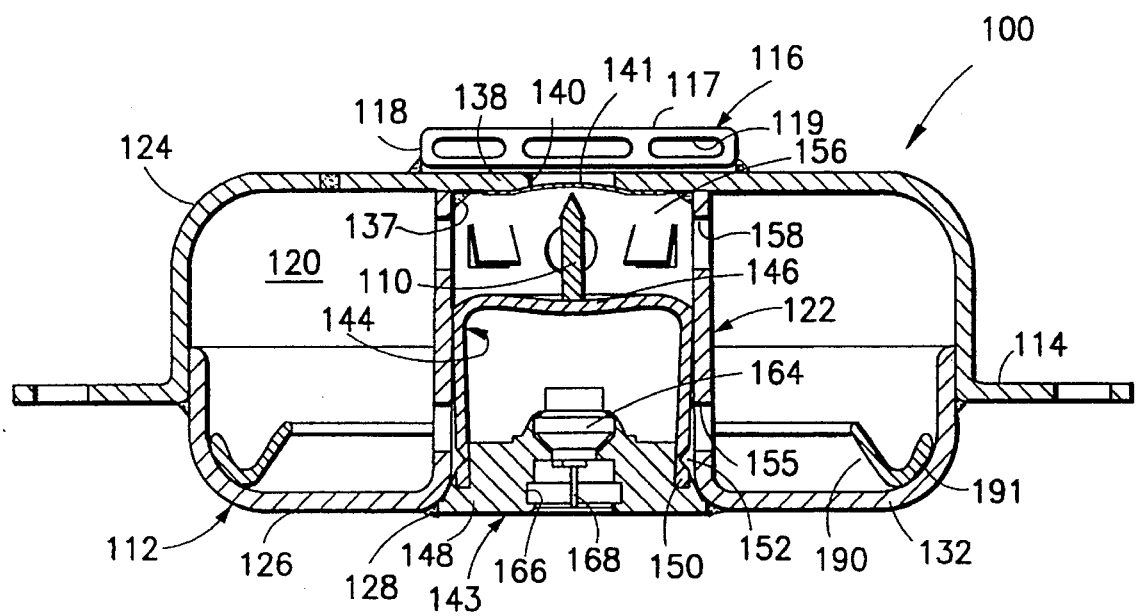
FIG. 4 is a cross-sectional view of another embodiment of a hybrid inflator according to the invention herein.
Figure 5:
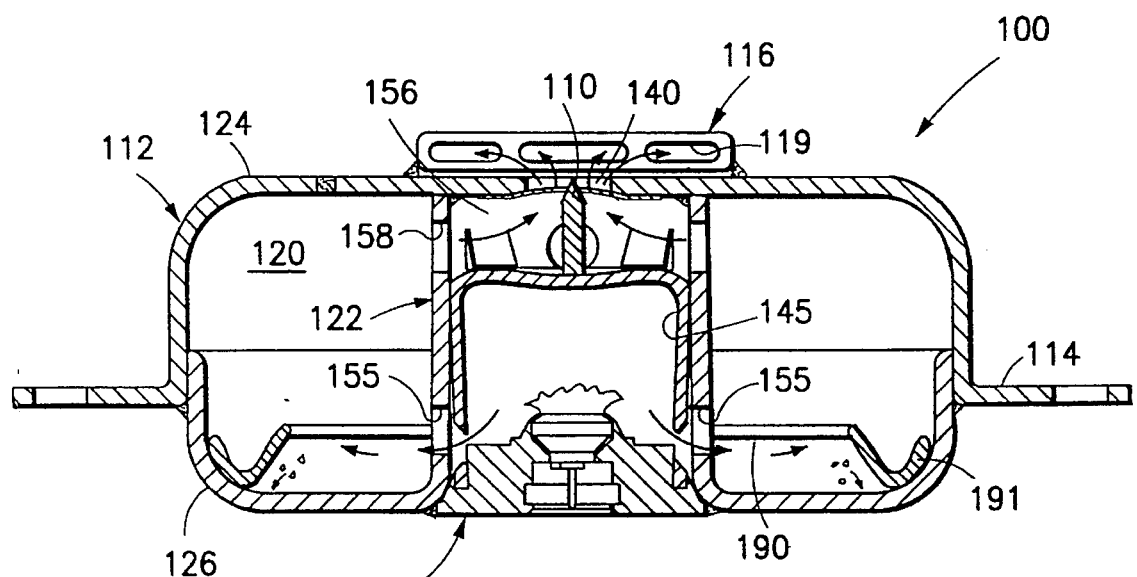
FIG. 5 is a cross-sectional view of the hybrid inflator of FIG. 4, shown operationally delivering inflation gas.

Another hybrid inflator 100 according to the invention herein is shown in its assembled condition in FIG. 4 and its operative condition in FIG. 5. The hybrid inflator 100 is similar to the hybrid inflator 10 above, having a housing formed of stamped metal parts and defining a toroidal gas storage chamber 120 surrounding a generally cylindrical center tie 122 The housing 112 is fabricated of an upper housing part including a mounting flange 114, and a lower housing part 126. One distinction between the hybrid inflator 100 and the hybrid inflator 10 described above is that the upper housing part 124 includes the top wall 138 of the outlet cavity 156 and defines the outlet orifice 140 therefrom, and the lower housing part 126 includes the tapered sidewall of the center tie 122 which is welded at its upper end to the upper housing 124, the weld being indicated at 137. This demonstrates the flexibility in design available in providing an inflator of stamped metal parts.

The hybrid inflator 100 comprises an igniter assembly 143, and is provided with a lance 110 mounted to and extending from the convex bottom 146 of inverted cup 144 toward metal diaphragm 141 covering the outlet orifice 140.

The inverted cup 144 has a lower lip 150 separated from a sliding piston portion 145 by a circumferential groove 152. The lip 150 is welded to a machined squib holder 148 fitted into the lower portion of the center 122 and welded to the lower housing part 126, at 128. The squib holder 148 mounts squib 164 and defines a recess 166 for a plug connector to the squib leads 168.

Another distinction of the hybrid inflator 100 is a rigid diffuser 116 welded to the top wall 138 and including a top panel 117 and a sidewall 118 defining radial exit ports 119.

In the assembled, pre-operational condition shown in FIG. 4, the lance 110 has its tip adjacent the metal diaphragm 141, and as the inverted cup is driven upward to the operative position shown in FIG. 5, the lance 110 mechanically pierces the diaphragm 141. This allows stored gas to exit the outlet orifice 140 and diffuser prior to any substantial heating and expanding of the stored gasses by the ignited pyrotechnic material, and thereby softens the onset of pressure applied to the airbag. The rigid diffuser provides a clear path to the airbag for the softer onset of pressurized inflation gas.

The hybrid inflator 100 is further equipped with an internal baffle 190 extending upwardly from the bottom wall of the lower housing part 126, generally surrounding the inlet openings 155 from the combustion chamber and in the path of the exiting products of combustion. When the pyrotechnic gas generant material is ignited and the sliding piston portion 145 of cup 144 separates from its lip 150 and moves upwardly to expose inlet openings 155, some particulates and incomplete products of combustion exit he openings and impinge on the baffle 190. Some of those particles and incomplete products of combustion plate onto the baffle, and others are deflected downwardly by the baffle, away from the gas flow to the outlet openings 158 leading to the outlet cavity 156. The baffle includes a base portion 191 which conforms to and is used to mount the baffle within the lower housing part 126. This may be accomplished by spot welds, in that no sealing function is required.

The hybrid inflator 100 operates similarly to the hybrid inflator 10 described above, with the exception that the metal diaphragm covering the outlet orifice is ruptured earlier in the inflation cycle and the inflation gas flows through a rigid diffuser, as noted in the preceding paragraphs. Further, the baffle 190 assists in reducing any particles which might otherwise be included in the outlet flow.

Accordingly, preferred embodiments of hybrid inflators have been described which admirably achieve the objects of the invention herein. With reference to the description of the preferred embodiments, those skilled in the art will appreciate that modifications may be made without departing from the spirit of the invention. Therefore, it is not intended that the scope of the invention be limited to the specific embodiments illustrated and described. Rather, it is intended that the scope of the invention be determined by the appended claims and equivalents thereof.

We claim:

1. A hybrid inflator comprising a housing having:
   A) an upper stamped metal housing part including a top wall and a cylindrical sidewall depending therefrom;
   B) a lower stamped metal housing part including a bottom wall, a cylindrical sidewall extending upwardly therefrom and engaged with the cylindrical sidewall of the upper housing part and welded thereto, and a generally cylindrical center tie integrally formed in one piece with the bottom wall and extending from the bottom wall to the top wall and welded to the top wall;
   C) an upper wall integrally formed in one piece with one of the upper or lower housing parts and extending across the upper end of the center tie;
   D) the housing defining a gas storage chamber surrounding the center tie and the center tie defining at least one inlet opening to the gas storage chamber and the housing further defining a rupturably sealed outlet orifice from the gas storage chamber; and
   E) an igniter assembly mounted in the center tie and including a pyrotechnic gas generant material for producing and delivering hot gasses to the gas storage chamber through the inlet opening thereto.

2. A hybrid inflator as defined in claim 1 wherein the upper wall defines the rupturably sealed exit orifice from the housing, and the upper wall, center tie and igniter assembly defines an outlet cavity adjacent the exit orifice, the outlet cavity communicating with the stored gas chamber through at least one outlet opening defined by the center tie.

3. A hybrid inflator as defined in claim 2 wherein the igniter assembly further comprises a stamped metal squib holder secured across the lower end of the center tie and a squib mounted therein, the igniter assembly including the squib holder and squib defining a combustion chamber for the pyrotechnic gas generant material.

4. A hybrid inflator as defined in claim 3 and further comprising a bottom plate secured to the bottom wall of the housing and extending acros the lower end of the center tie, the bottom plate defining an opening for ebracing and supporting a plug connter for providing an initiator signal to the squib.

5. A hybrid inflator as defined in claim 1 wherein the housing further comprises a mounting flange integral with one of the upper or lower stamped metal housing parts.

6. A hybrid inflator as defined in claim 1 and further comprising a stamped metal deformable diffuser including a top panel and a cylindrical diffuser sidewall, the cylindrical diffuser sidewall secured to the cylindrical sidewall of the upper housing part with the top panel lying closely adjacent the top wall and outlet orifice of the housing, and the top panel being deformable away from the top wall of the housing by inflation gasses from the exit orifice, the diffuser sidewall defining outlet openings for delivering the inflation gas to an airbag.

7. A hybrid inflator as defined in claim 1 wherein the igniter assembly further comprises a stamped metal squib holder secured across the open end of the center tie, and a squib mounted therein, the igniter assembly including the squib holder and together defining a combustion chamber for the pyrotechnic gas generant material.

8. A hybrid inflator as defined in claim 1 and further comprising a baffle secured to the housing within the gas storage chamber and positioned to receive incomplete combustion products and debris delivered to the gas storage chamber through the at least one inlet opening from the igniter assembly, said baffle angled to deflect debris away from the outlet orifice and the path of gas flow leading to the outlet orifice.

9. A hybrid inflator as defined in claim 8 wherein the center tie defines a plurality of inlet openings thereabout and the baffle is positioned surrounding the center tie.

10. A hybrid inflator as defined in claim 9 wherein the baffle is a stamped metal part welded to the lower housing part.

* * * * *

UNITED STATES PATENT AND TRADEMARK OFFICE
CERTIFICATE OF CORRECTION

PATENT NO. : 5,588,676

DATED : December 31, 1996

INVENTOR(S) : Clark et al.

It is certified that error appears in the above-indentified patent and that said Letters Patent is hereby corrected as shown below:

Col. 3, line 50 of the patent, "6" should be "16".

Col. 4, line 16 of the patent, insert -- 40 -- after "orifice".

Col. 5, line 62 of the patent, insert -- 112 -- after "housing".

Col. 5, line 65 of the patent, insert a period " . " after "122".

Col. 6, line 34 of the patent, insert -- 132 -- after "wall".

Col. 6, line 46 of the patent, insert -- 190 -- after "baffle".

Col. 8, line 1 of the patent, "ebracing" should be "embracing".

UNITED STATES PATENT AND TRADEMARK OFFICE
CERTIFICATE OF CORRECTION

PATENT NO. : 5,588,676

DATED : December 31, 1996

INVENTOR(S) : Clark et al.

It is certified that error appears in the above-indentified patent and that said Letters Patent is hereby corrected as shown below:

Col. 8, line 2 of the patent, "plug connter" should be "plug connector".

Signed and Sealed this

Tenth Day of June, 1997

Attest:

BRUCE LEHMAN

Attesting Officer

Commissioner of Patents and Trademarks